(No Model.)
A. J. BRUNER.
GARDEN CULTIVATOR.
No. 487,113.
Patented Nov. 29, 1892.
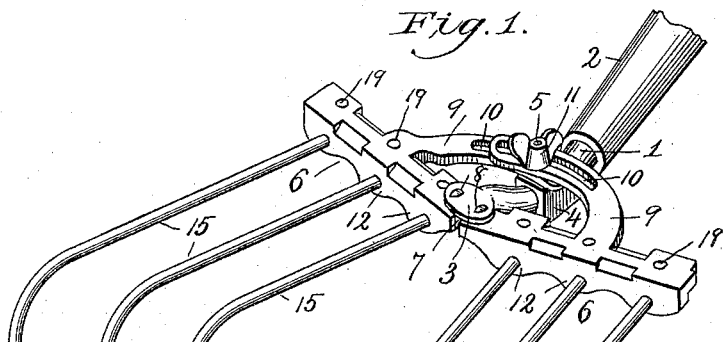
Fig. 1.
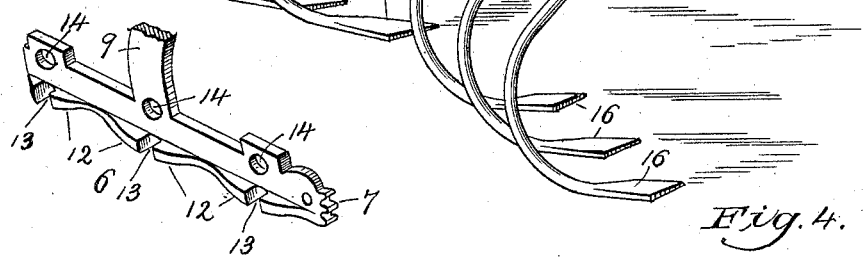
Fig. 2.
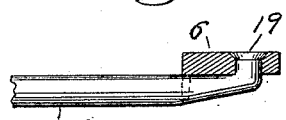
Fig. 3.
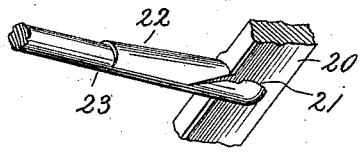
Fig. 4.
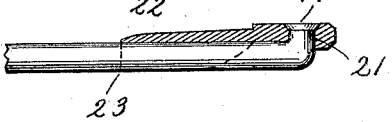
Fig. 5.
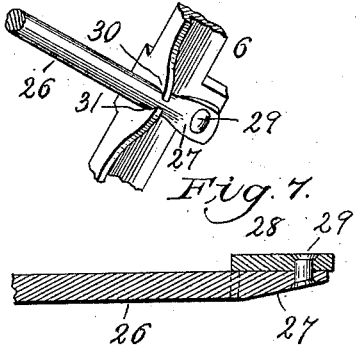
Fig. 6.
Fig. 7.
Witnesses
Wm. A. Schoenborn.
John H. Siggers
Inventor
Andrew J. Bruner.
By his Attorneys,
C. A. Snow & Co.

UNITED STATES PATENT OFFICE.

ANDREW J. BRUNER, OF MADISON, MISSOURI.

GARDEN-CULTIVATOR.

SPECIFICATION forming part of Letters Patent No. 487,113, dated November 29, 1892.

Application filed June 14, 1892. Serial No. 436,719. (No model.)

*To all whom it may concern:*

Be it known that I, ANDREW J. BRUNER, a citizen of the United States, residing at Madison, in the county of Monroe and State of Missouri, have invented a new and useful Garden-Cultivator, of which the following is a specification.

My invention relates to improvements in garden cultivators or rakes; and the objects in view are to provide a convenient hand implement adapted to be employed in the garden for the cultivation of small plants, vegetables, &c., the teeth of which may be spread to widen or narrow the implement and to straddle a row; to so construct the implement as to maintain the handle exactly at the center of the line of draft, and to provide a durable and efficient means for securing the teeth in position, whereby they are prevented from loosening or from having any lateral movement.

Other objects and advantages of my invention will appear in the following description, and the novel features thereof will be particularly pointed out in the claims.

Referring to the drawings, Figure 1 is a perspective of an implement constructed in accordance with my invention. Fig. 2 is a detail of one of the drag or cultivator bars. Fig. 3 is a transverse section through the bar at one of the joints of the same with a tooth. Fig. 4 is a perspective view of a modified construction. Fig. 5 is a section of the same. Fig. 6 is a perspective view of a second modification. Fig. 7 is a section of the same.

Like numerals of reference indicate like parts in all the figures of the drawings.

1 designates a cylindrical tang, which fits in the socket of a handle 2, and the same is bent midway its ends and extended forwardly at an angle to its upper portion and terminates at its outer or forward extremity in a transversely-widened head 3, which is bifurcated, forming upper and lower plates. At its bend the tang is provided with a squared portion or rest 4, forming a boss, and the same has an opening, from which protrudes upwardly a threaded stud 5.

The drag or cultivator bar is formed in two sections 6, and each has its inner end curved and provided with segments or teeth 7 and concentrically with them is pivoted by bolts or rivets 8 between the upper and lower plates of the aforesaid tang, the teeth of the two bars intermeshing or working in each other. Curved braces 9 project rearwardly and inwardly from the centers of the sections and overlap upon the boss, said braces being curved concentric with the rivets 8. These braces are slotted longitudinally at 10 and receive the upwardly-projecting threaded stud and are secured in position by a thumbnut 11, mounted on the stud and impinging upon the upper brace. It will be seen that by loosening the thumb-nut the drag or cultivator bars may be swung at any desired angle to each other and that by the adjustment of one, it intermeshing with the other, it will cause a similar or exactly proportionate adjustment of the other.

Various means may be provided for securing the teeth to the drag or cultivator bar sections 6, and, while not limiting my invention to any particular way, I have herein illustrated and will describe three ways of accomplishing the same.

In my preferred construction I form at the front edge of each section 6 depending flanges 12 and provide the same at their lower edges with notches 13, which are directly in front of perforations or holes 14, formed in the bar-sections. 15 designates the series of teeth, which terminate at their outer extremities in flattened shovel-points 16. Each bar-section carries three of these teeth in this instance, or their number may be increased or decreased, as preferred. The two inner teeth of the sections are shorter than the intermediate teeth, and the outer teeth are longer than the intermediate teeth, so that when the bar-sections are swung at an angle to each other the teeth are about in transverse alignment, by which arrangement I obviate the disadvantage of arranging the teeth one behind the other, or nearly so, which would be the case if the shorter teeth were at the outer ends of the sections or if the teeth were all of the same length. The bodies of the teeth are preferably cylindrical, as are also the perforations 14 and as are nearly so the notches 13. In securing the teeth in the sections the butts of the teeth are first introduced through the notches and are upwardly bent through the perforations 14, where they are headed at 19, after which the metal about the notches is upset, so as to snugly embrace the teeth. It will thus be seen that a most effectual connection between the teeth and bar-sections is formed and one in which no lateral play or working loose of the teeth will be permitted; furthermore, that a retightening of the teeth may be secured at any time by a few taps of the hammer upon the upset ends of the teeth and the upset portions of the flanges.

In Fig. 4, 20 designates the bar-section, having a perforation 21 and at its front end a forwardly-disposed flange nearly circular in cross-section and designated as 22. The shank of the tooth 23 is located in the flange 22 and its butt upwardly bent and introduced through the aforesaid perforation of the bar-section, where it is upset to form a head 24, after which the opposite edges of the flange are hammered down upon the tooth.

In Figs. 6 and 7 I have illustrated a second modification, and this construction is very similar to that shown in Figs. 1, 2, and 3, the difference merely consisting in flattening the rear end or butt of the shank of the tooth 26, as indicated at 27, perforating the same, and riveting it to the bar-section 28, as at 29. The flange 30 is employed, as in the first instance, and it has a notch 31, which receives the shank, the metal around the notch being upset to clamp upon the shank.

From the foregoing description, in connection with the accompanying drawings, it will be seen that I have provided a garden-cultivator of very simple, strong, and durable construction the sections of which automatically assume the same relative angle, may be conveniently secured, and whose teeth are perfectly rigid and immovable.

Having described my invention, what I claim is—

1. In an implement of the class described, the combination, with the tang, of the opposite tooth-carrying bar-sections pivoted to the tang and having their inner adjacent ends provided with a curved series of teeth engaging with each other and means for securing the sections at an angle to each other, substantially as specified.

2. In an implement of the class described, the combination, with the tang terminating at its front end in a transversely-bifurcated head, of a pair of tooth-carrying bar-sections pivoted adjacent to each other in the head and provided at their inner ends at their rear corners with a curved series of interlocking teeth, a threaded stud rising from the tang in rear of its head, curved braces rearwardly and inwardly extended, slotted, and overlapping the tang and receiving the stud, and the set-nut threaded on the stud and impinging upon the braces, substantially as specified.

3. In an implement of the class described, the combination, with a handle, of a pair of harrow-bar sections pivotally connected thereto and a series of teeth extending from each of the bar-sections, said teeth being increased in length toward the outer end of the series, substantially as specified.

In testimony that I claim the foregoing as my own I have hereto affixed my signature in the presence of two witnesses.

ANDREW J. BRUNER.

Witnesses:
   J. W. HOUCHINS,
   R. Y. TODD.